Jan. 1, 1946. J. C. HOBBS 2,391,900
PRESSURE SEALING JOINT
Filed June 15, 1943
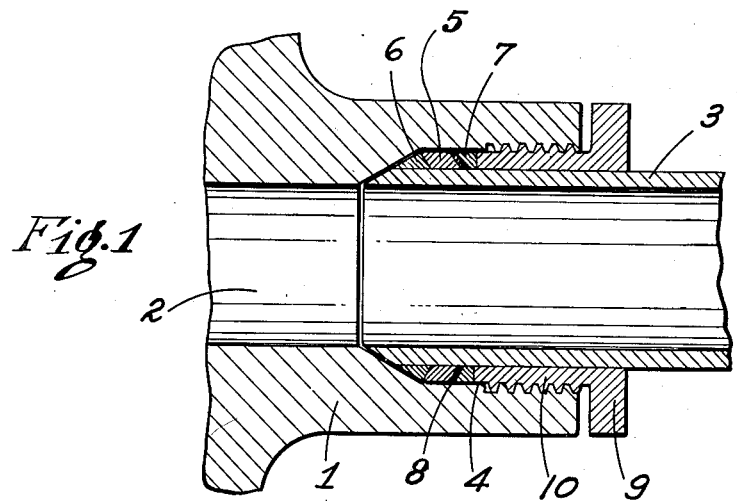
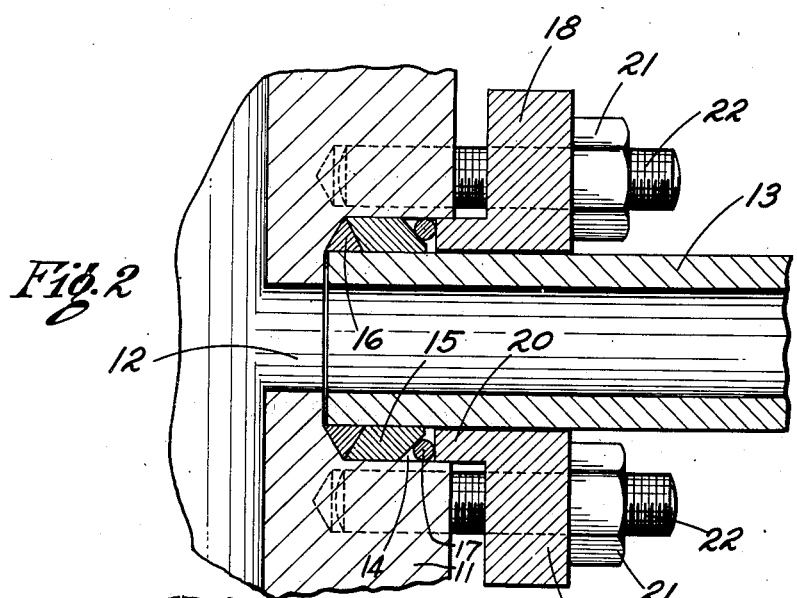
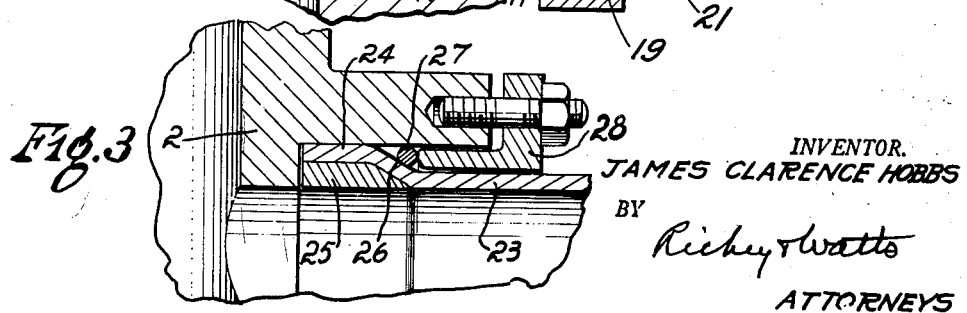
INVENTOR.
JAMES CLARENCE HOBBS
BY
Richey & Watts
ATTORNEYS Patented Jan. 1, 1946

2,391,900

UNITED STATES PATENT OFFICE 2,391,900

PRESSURE SEALING JOINT

James Clarence Hobbs, Painesville, Ohio

Application June 15, 1943, Serial No. 490,913

5 Claims. (Cl. 285—167)

This invention relates generally to the art of handling high pressure fluids and more particularly to seals for valves used with high pressure fluid, for example, high temperature, high pressure steam, or medium temperature water under high pressure. Altho the present invention is particularly adapted for preventing the escape of fluid pressures on the order of 2500 pounds per square inch, it is also suitable for use with pressures down to 1000 pounds per square inch or lower.

This invention is particularly adaptable to connections between pipes carrying high pressure fluids and high pressure valves.

This application is a continuation-in-part of my copending application Ser. No. 320,476, filed February 23, 1940, from which Patent No. 2,321,597 issued on June 15, 1943. Other subject-matter shown but not claimed in that application or in this application is being claimed in my copending applications Serial Numbers 490,911 and 490,912, filed June 15, 1943.

Prior to the present invention the valves which were available for high pressure fluids were generally similar in design to the valves previously used for much lower pressures, the main differences being that the parts of the older valves were greatly enlarged to make them strong enough to withstand the higher pressures. In other words, the design of the high pressure valves available on the market now is more or less orthodox and involves no fundamental differences over the low pressure valves and include no particular means, except heavier metal parts, for meeting the needs peculiar to control of fluids under high pressures.

The present day high pressure valves possess a number of important disadvantages. They are composed of large, heavy metal parts and, therefore, are uneconomical as regards the space required, the supports required to support their weight, and the large amount of metal which is present in their construction. Any decrease which is possible in the size, weight and amount of metal employed in high pressure valves is quite important because of the resultant saving in space, in supporting means and in cost of metal, and in reduction of temperature differentials and corresponding stresses.

The valve bodies of the present-day high pressure valves are provided with large flanges around some of, or all, the openings, particularly the opening which receives the valve unit and usually at the openings where pipe connections are to be made. The parts which are to be connected to such flanges are likewise flanged. Gaskets are used between two opposed flanges to seal the opening and a large number of good sized bolts spaced short distances apart are relied on to compress the gasket and prevent escape of high pressure fluid between the flanges. Not only is this construction unduly heavy but it is not safe when in use. Since the pressure area of the valve body opening is much smaller than that of the gasket or sealing area, and since the load varies directly as the square of the diameter of the sealing area, the load which bolts must carry is greater than the actual load on the valve body. It is necessary, therefore, to provide flanges and bolts which will withstand this increased load, and to place the flange bolts as close together as possible, for the load must be carried by the tensile strength of the bolts. If the load is sufficient to stretch the bolts even slightly, the high pressure fluid may escape past the gasket, and if it is sufficiently high to exceed the ultimate strength of the bolts and break them, the entire valve fails and may result in injury to workmen as well as the shutting down of a power plant costing millions of dollars.

Moreover, such a construction does not permit any relative expansive and contracting movement of one valve part relative to another with temperature changes, and since the valve parts are not subjected to equal and simultaneous heating and cooling, considerable variation in the sizes of the two adjacent parts is common. For example, when high temperature fluid is admitted into a flanged valve body, the body will expand at a rate different from that of a flanged connection at the valve unit opening. Such differential expansion can take place in present day valves only by deflection of the weaker of two differently expansible elements or parts. While present-day valve constructions may permit such deflections at lower temperatures, it seems that there is a limit at about 500° F. fluid temperature beyond which either the joints become leaky or the bolts become overstrained or broken when differential expansion occurs.

The present invention aims to avoid the disadvantages and shortcomings of the prior high pressure devices which are traceable to the previous types of connections between high pressure valves and pipes. It achieves this aim by the simplified, yet highly effective, combination of parts and construction and operation of parts set out and claimed hereinafter.

In the drawing accompanying and forming a part of this specification:

Figure 1 is a fragmentary, sectional view of one form of device embodying the present invention;

Figure 2 is a similar view showing another embodiment of the present invention; and, Fig. 3 is a similar view showing another embodiment of the present invention.

In Figure 1, I designates a projecting portion of a high pressure valve body, for example, the body of the check valve of Fig. 1 or the body of the pressure reducing valve of Fig. 2, both of my above identified patent. This body portion I has a passage 2 and a recess 4 into which the end of pipe 3 extends. It will be understood that high pressure fluid is to be prevented from escaping between body I and pipe 3.

The pipe 3 has an end portion whose outside diameter is enlarged as compared with the outside diameter of the adjacent parts of the tube. This end portion, as shown, consists of a metal ring 5 which surrounds the pipe and is attached thereto by weld metal 6. Another metal ring 7 slidably surrounds pipe 3 on the low pressure side of the said enlarged portion of the pipe. Packing 8 surrounds the pipe between ring 7 and portion 5. This packing is shown as engaging the low pressure side of the said enlarged end portion and engages the inner surfaces of the recess 4 and the outer surface of pipe 3. Gland 9, comprising an annulus 10 having screw-threaded engagement with member I around pipe 3, serves to force ring 7 against packing 8 and the latter against portion 5 and body I and thereby to seal the space between the body I and pipe 2 against escape of fluid under pressure between the body and the pipe, even tho the threads do not fit with fluid sealing tightness.

In Fig. 2, II designates a part of a high pressure control valve, for example, the valve shown in Fig. 3 of my copending application Ser. No. 490,912, filed June 15, 1943, and originally shown in Fig. 4 of my application Ser. No. 320,476. This body II is provided with a passage 12 and a recess 14. One end of pipe 13 extends into said recess. This pipe has an end portion whose outside diameter is greater than the adjacent outside diameter of the pipe. This enlarged end portion, as shown, is formed by a ring 15 which is secured to the pipe by weld metal 16. The low pressure side of ring 15 is inclined at an acute angle to the axis of pipe 13. Packing, in the form of a ring 17, engages the inclined surface of ring 15. Gland 18 consists of a flange part or annulus 19, and a cylindrical part 20 which bears against the low pressure side of packing 17. Nuts 21 on studs 22, which are attached to the body II, bear against the flange portion 19 and serve to force the cylindrical part 20 against the packing 17, thereby bringing the packing into sealing engagement with the pipe 13 and body I so as to seal against the flow of high pressure fluid between these members.

It will be understood that the enlarged end portion of pipe 3 need not be made by welding a ring to the pipe. For example, the pipe may be radially expanded, or a ring may be screw-threaded to the pipe, or the pipe may be upset. When thin pipe is radially expanded a strengthening member, as a ring, may be provided which bears against the inner surface of the expanded portion. Any of the expedients may be employed as desired.

In Fig. 3 pipe 23 has a radially expanded end 24 and strengthening ring 25 bears against the inner surface of expanded portion 24. The outer surface 26 of pipe 23 which connects the expanded and unexpanded portions of the pipe is inclined at an acute angle with the side wall of the pipe receiving recess of body 2. A deformable metal packing ring 27 bears against inclined surface 26. Annulus 28 extends into the recess in the body 2 about the pipe and is engageable with packing 27 to force it against inclined surface 26 and the opposed surface of the recess.

The packing may be composed of any deformable material suitable to the temperature and fluid present, for example, fiber, and metallic or non-metallic plastics or elastic materials.

This invention makes it possible to seal thin walled pipes without danger of deforming the pipes and without using the ordinary heavy flanges. This advantage results from the fact that the seal is made by forces applied axially to the packing and to the enlarged end portion of the pipe.

Another feature of this invention is the fact that when the packing is deformable metal it has a small area of sealing contact initially with the pipe and the surrounding body and that this area increases with the increases in pressure applied by the gland or other retaining means and with the increase in the pressure of the fluid. This feature is important because it enables the packing to adjust itself to inequalities in the surfaces contacting therewith so as to obtain a seal which is tight initially and becomes even tighter with increased pressure. Also the pressure on the packing may be increased manually while fluid pressure is on the joint.

In Fig. 2 the metal ring has a limited area of contact with the conical surface of end portions 15 of the pipe and also with the cylindrical surface of recess 14. In each instance the surfaces are inclined at small acute included angles adjacent to the areas of contact. As the pressure applied increases those areas of contact enlarge. Ring 17 may be attached to member 20 if desired or the cross-sectional shape of ring 17 may be any other shape such as a triangle which will give the initially small area of contact and the small angle adjacent thereto.

Having thus described the invention so that others skilled in the art may be able to understand and practice the same, I state that what I desire to secure by Letters Patent is defined in what is claimed.

What is claimed is:

1. A pressure sealing joint, in which the sealing pressure varies with the fluid pressure, comprising a body having a fluid passage and a pipe receiving recess aligned therewith and defined by end and side walls, an exteriorly enlarged pipe end in and spaced apart from the end and side walls of the recess, the low pressure side of said enlarged pipe end forming an acute included angle with the side walls of said recess, means attached to said body and including an annulus extending into the recess about the pipe, and deformable packing around the pipe between the inclined side of the enlarged pipe end and the annulus, said pipe being movable axially relative to said annulus under the influence of varying fluid pressure in said passage and serving to vary correspondingly the pressure exerted by the packing on the enlarged pipe end and on the side wall of the recess.

2. A pressure sealing joint, in which the sealing pressure varies with the fluid pressure, comprising a body having a fluid passage and a pipe receiving recess aligned therewith and defined by end and side walls, a radially expanded pipe end in and spaced apart from the end and side walls of the recess, the low pressure side of said expanded pipe end forming an acute included angle with the side wall of said recess, ring-like strengthening means at the inner surface of said pipe end, deformable packing around the pipe and engageable with the inclined low pressure side of the pipe end and the side wall of said recess, and means attached to said body and including an annulus extending into the recess about the pipe and engageable with said packing, said pipe end being movable axially relative to said annulus under the influence of varying fluid pressure in said passage and serving to vary correspondingly the pressure exerted by the packing on the pipe and on the side wall of the recess.

3. A pressure sealing joint, in which the sealing pressure varies with the fluid pressure, comprising a body having a fluid passage and a pipe receiving recess aligned therewith and defined by end and side walls, a pipe having a ring secured to its exterior near one end thereof, said pipe end and ring being disposed in and spaced apart from the end and side walls of the recess, the low pressure side of said ring forming an acute included angle with the side walls of said recess, means attached to said body and including an annulus in the recess about the pipe, and deformable packing around the pipe engaging the inclined side of the ring, the side wall of the recess, and the annulus, said pipe being movable axially relative to said annulus under the influence of varying fluid pressure in said passage and serving to vary correspondingly the pressure exerted by the packing on the ring and on the side wall of the recess.

4. A pressure sealing joint, in which the sealing pressure varies with the fluid pressure, comprising a body having a fluid passage and a pipe receiving recess aligned therewith and defined by end and side walls, an exteriorly enlarged pipe end in and spaced apart from the end and side walls of the recess, the low pressure side of said enlarged pipe end forming an acute included angle with the side walls of said recess, means attached to said body and including an annulus in the recess about the pipe, and a deformable metal packing ring around the pipe and engaging the inclined side of the enlarged pipe end, the side wall of the recess, and the annulus, said pipe being movable axially relative to said annulus under the influence of varying fluid pressure in said passage and serving to vary correspondingly the pressure exerted by the packing on the enlarged pipe end and on the side wall of the recess.

5. A pressure sealing joint, in which the sealing pressure varies with the fluid pressure, comprising a body having a fluid passage and a pipe recess aligned therewith and defined by end and side walls, an exteriorly enlarged pipe end in and spaced apart from the end and side walls of the recess, the enlarged pipe having an inclined surface on its low pressure side forming an acute included angle with the side walls of said recess, deformable means around the pipe between the inclined surface of the enlargement and said side wall of the body, and means including an annulus in the recess for pressing said deformable means into engagement with said inclined and side surfaces, said pipe being movable axially relative to said annulus under the influence of fluid pressure in said passage and serving thereby to vary the pressure exerted by the packing on the enlargement and on the side wall of the recess.

JAMES CLARENCE HOBBS.